United States Patent [19]

Muramatsu

[11] Patent Number: 4,991,537

[45] Date of Patent: Feb. 12, 1991

[54] INDICATOR

[75] Inventor: Masahiro Muramatsu, Shizuoka, Japan

[73] Assignee: Yazaki Corporation, Japan

[21] Appl. No.: 304,836

[22] Filed: Feb. 1, 1989

[30] Foreign Application Priority Data

Feb. 3, 1988 [JP] Japan .................................. 63-12513

[51] Int. Cl.⁵ .......................................... G01D 11/28
[52] U.S. Cl. .................... 116/286; 362/23; 362/84
[58] Field of Search ............... 116/284, 286, DIG. 36, 116/DIG. 41, 46, 47, 48, 49, 54, 202, 334; 362/23, 61, 84, 259, 29, 30, 26; 40/542, 543; 250/462.1, 463.1; 427/157

[56] References Cited

U.S. PATENT DOCUMENTS

| | | | |
|---|---|---|---|
| 2,381,924 | 8/1945 | Overton | 250/463.1 |
| 4,044,708 | 8/1977 | Klein | 116/286 |
| 4,443,835 | 4/1984 | Brantigam et al. | 362/30 X |
| 4,536,656 | 8/1985 | Sowa | 362/84 |
| 4,561,042 | 12/1985 | Wehner et al. | 362/30 |
| 4,581,683 | 4/1986 | Reiter et al. | 362/23 |
| 4,652,464 | 3/1984 | Ludlum et al. | 427/159 |
| 4,772,986 | 9/1988 | McNemor | 362/23 |
| 4,807,091 | 2/1989 | Obata | 116/286 |
| 4,841,155 | 6/1989 | Ushida et al. | 250/463.1 |

FOREIGN PATENT DOCUMENTS 1806718 11/1970 Fed. Rep. of Germany ........ 362/23
62-282225 12/1989 Japan .................................. 116/286

Primary Examiner—Allan N. Shoap
Attorney, Agent, or Firm—Wigman & Cohen

[57] ABSTRACT

Disclosed herein is an improvement of an indicator such as a speed meter, a tachometer, or the like for use in a motor vehicle. The indicator comprises a scale plate having a pointer rotatably mounted thereon, indicia provided on the scale plate and containing fluroescent brigthener, the indicia indicating a specific value in cooperation with the pointer, a single ultraviolet light source for illuminating the indicia, and technique for equalizing the brightness of the indicia.

The equalizing technique can comprises varying the quantity of fluorescent brigtener contained in the indicia according to the distance from the ultraviolet light source of the indicia.

5 Claims, 1 Drawing Sheet

INDICATOR

BACKGROUND OF THE INVENTION

1. Field of the Invention

This invention relates to an indicator, and more particularly to an improved indicator such as a speedometer or a tachometer or the like, which includes an ultraviolet lamp for illuminating indicia such as scales or numerals provided on a scale plate of the indicator.

1. Description of the Prior Art

One type of indicator known in the prior art includes an ultraviolet lamp for illuminating indicia, such as scales or numerals, which contain fluorescent brightener therein and are provided on a scale plate of the indicator. In such a conventional indicator, since the indicia are illuminated by the ultraviolet light emitted from the lamp, it was possible to obtain good illumination of the indicia even when there was very little external lighting.

In the conventional indicator, the ultraviolet lamp was provided either on the upper or the lower side of a hood cover disposed on the front side of the scale plate. Therefore, the ultraviolet light from the ultraviolet lamp is always irradiated toward the indicia on the scale plate from the upper front side or the lower front side of the scale plate. As a result, a problem arose in that the indicia located near the ultraviolet lamp receive a large quantity of light while the indicia located far from the lamp receive a small quantity of light.

This means that when the ultraviolet lamp is disposed on the upper side in the hood cover, the indicia located on the lower side of the scale plate become relatively dim in comparison with indicia located on the upper side thereof. On the other hand when the ultraviolet lamp is disposed on the lower side in the cover, the indicia located on the upper side of the scale plate become relatively dim in comparison with the indicia located on the lower side of the scale plate. Therefore, when only a single ultraviolet lamp is provided, the brightness of the indicia varies in proportion with the distance to the lamp due to spectral dispersion of the ultraviolet light. Namely illumination of the indicia is not uniform in brightness, resulting in poor overall visibility for the indicator.

In order to overcome the problem mentioned above, it has been proposed that two ultraviolet lamps be disposed on both upper and lower sides in the hood cover to illuminate the scale plate from both sides in order to equalize the brightness of the indicia.

However, even though the visibility problem could be settled by the proposed indicator, another disadvantage will arise. Namely, the proposed indicator will necessitate having to provide an additional ultraviolet lamp and an accommodating space for the additional lamp in the indicator, and this will lead to increased size and manufacturing difficulty for the indicator.

SUMMARY OF THE INVENTION

In view of the above problems of the prior art indicators, this invention has been made. Accordingly, a main object of the present invention is to provide an indicator which is capable of equalizing the brightness of indicia, in which only a single ultraviolet lamp is used for illuminating the indicia.

In order to accomplish the above object, an indicator according to the present invention comprises: a scale plate having a pointer rotatably mounted thereon; indicia provided on the scale plate and containing fluorescent brightener therein, the indicia indicating a specific value in cooperation with the pointer; a single ultraviolet light source for illuminating the indicia; and means for equalizing the brightness of the indicia.

The equalizing means comprises means for altering the quantity of fluorescent brightener of the indicia in order to compensate for the differences in distance to the ultraviolet light source.

According to the indicator having the above structure, the brightness of all the indicia is made equal in spite of the difference in distance from the ultraviolet light source to each indicia. Therefore, according to the present invention, since it is not necessary to provide another ultraviolet light source and a space therefor, as would be the case for the prior-art indicator, the indicator can be made compact and manufacturing costs can be kept down without deteriorating the visibility of the indicator.

BRIEF DESCRIPTION OF THE DRAWINGS

The objects and advantages of the present invention, as well as the details of the preferred embodiments, will be more fully understood when taken in conjunction with the following drawings, in which.

DETAILED DESCRIPTION OF THE PREFERRED EMBODIMENT

Figure 1:
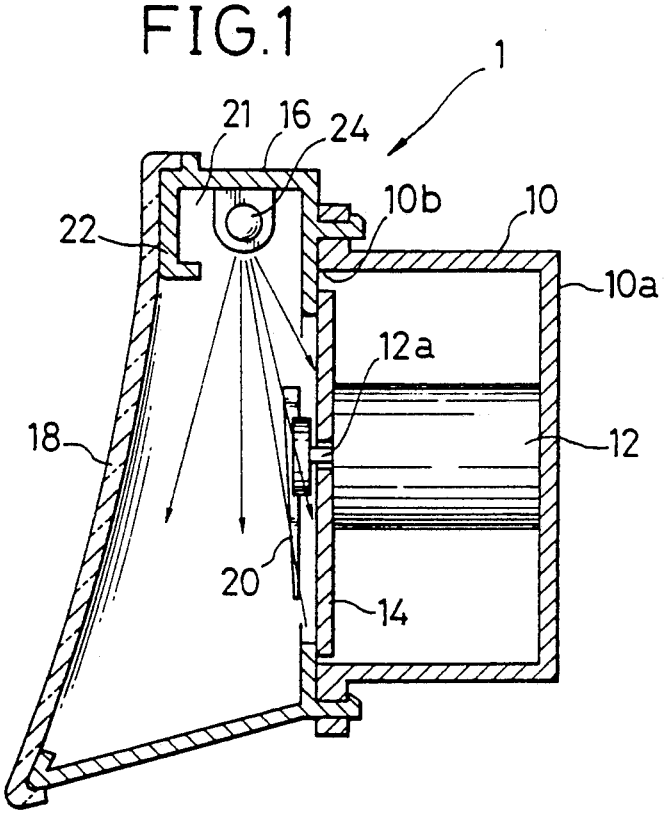
FIG. 1 is a cross-sectional view of an embodiment of an indicator according to the present invention.

Referring now to the drawings a preferred embodiment of the present invention will be described.

As shown in FIG. 1 an indicator 1 comprises a substantially cup-shaped casing 10 having a closed rear end 10a and an open front end 10b. In the casing 10, a movement 12 is disposed. On the front portion of the movement 12 there is provided a scale plate 14 which is positioned at the open front end 10b of the casing 10. On the open front end 10b of the casing 10, there is provided a hood 10 having a substantially cylindrical shape so as to allow sight of the scale plate 14 therethrough from the outside. On the front side of the hood 16, there is attached a transparent front cover 18 formed from acrylic resin or the like.

On the front side of the scale plate 14, there is rotatably disposed a pointer 20. The pointer 20 is operatively connected through a shaft 12a to the movement 12. On the front surface of the scale plate 14, indicia 29 such as scales 26, numerals 28 or the like, are provided in such a manner that the pointer 20 indicates a specific value in cooperation with the indicia In this embodiment, the indicia 29 are arranged on the scale plate 14 by ink containing fluorescent brightener such as uranine, eosin, thioflavine T, rhodamine B, or the like. In this case it is preferable that the indicia 29 be printed on the scale plate by silk-screen.

Figure 2:
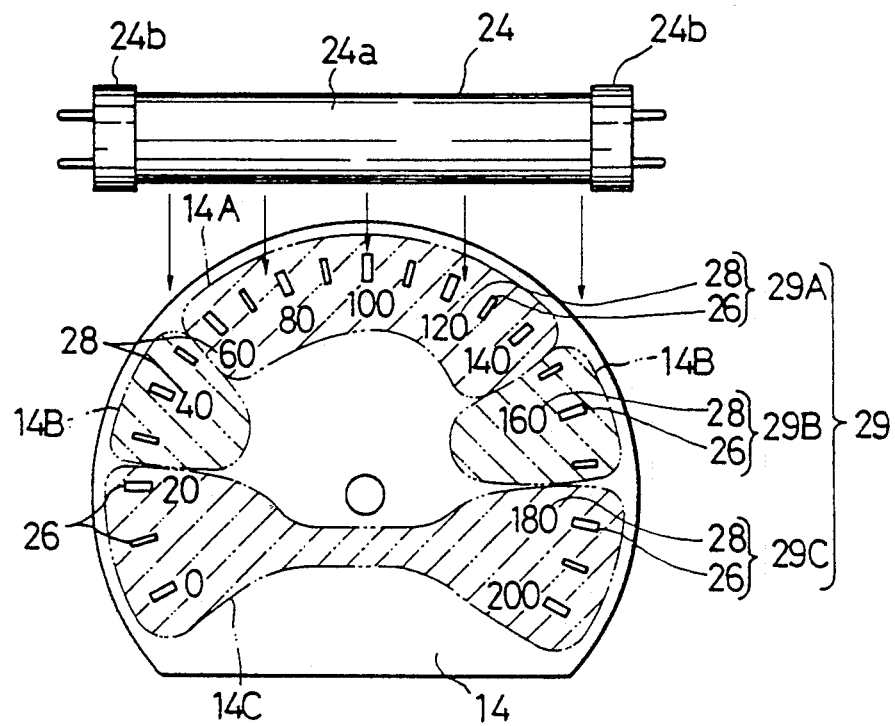
FIG. 2 is an explanatory drawing showing the main feature of the indicator of the embodiment in FIG. 1.

On the upper side of the hood 16, there is provided an ultraviolet lamp accommodating portion 21 which has a light shielding part 22 at the side of the front cover 18 for preventing the light from leaking directly to the outside. In the ultraviolet lamp accommodating portion 21, an ultraviolet light source 24, such as an ultraviolet lamp, is disposed so as to be located on the upper front side of the scale plate 14 and parallel thereto, as shown in FIG. 2.

The ultraviolet lamp 24 comprises a tubular portion 24a, and two sockets 24b each provided on the respective end of the tubular portion 24a like a fluorescent lamp. The distance between the sockets of the lamp 24 is set substantially equal to the diameter of the scale plate 14. Therefore, the ultraviolet lamp 24 illuminates the indicia 29 on the scale plate 14 from the upper front side of the scale plate as shown in FIG. 2.

With the above positional relationship of the ultraviolet lamp 24 and the scale plate 14 of this indicator, a first area 14A located on the upper portion of the scale plate 14 receives a large quantity of light from the lamp 24, a second area 14B located on both sides of the center portion of the scale plate 14 receives a medium quantity of the light and a third area 14C located on the lower portion of the scale plate 14 receives a small quantity of light.

In this case, as stated above, the indicia 29 such as scales 26 and numerals 28 contain a certain quantity of fluorescent brightener. Further, according to the present invention, when the indicia 29 are provided, the quantity of the fluorescent brightener contained in the indicia 29 are altered as follows; (a) the quantity of the fluorescent brightener in indicia 29C in the third area 14C is made to be the largest, (b) the quantity of the fluorescent brightener in indicia 29B in the second area 14B is made to be smaller than that of the third area 14C, and (c) the quantity of the fluorescent brightener in indicia 29A in the first area 14A is made to be the smallest. Namely, in this embodiment, the distribution of the quantity of the fluorescent brightener contained in the indicia 29 of each area is set in a reverse relationship with the spectral dispersion on the indicia 29 from the single ultraviolet lamp 24, thereby equalizing the brightness of all the indicia 29.

This condition can be analyzed as follows: (a) although the indicia 29A located in the first area 14A receive the largest quantity of light from the lamp, the brightness of the indicia 29A does not become so large since the quantity of the fluorescent brightener contained therein is made small; (b) although the indicia 29C located in the third area 14C receives the smallest quantity of light, the brightness of the indicia 29C becomes substantially equal to that of the indicia 29A of the first area 14A since the quantity of the fluorescent brightener in the indicia 29C is made large; and (c) the indicia 29B in the second area 14B can obtain substantially the same brightness as those of the indicia 29A, 29C of the first and third areas 14A, 14C, respectively since the quantity of the fluorescent brightener in the indicia 29B is made to be between those of the first and third areas.

As a result, the brightness of the indicia 29, during illumination from the single ultraviolet source 24 can be equalized on the whole, thereby achieving good overall visibility.

In this embodiment it is preferred that the indicia 29 be printed on the scale plate 14 with ink containing fluorescent brightener.

In the preferred embodiment described above it is to be noted that the relationship between the quantity of the fluorescent brightener and the brightness of the indicia of each area and the relationship between the quantity of the fluorescent brightener in the indicia of each area and the distance from the light source to each area have not been described in detail. However, those relationships are easily obtainable through simple experimentation by a person having ordinary skill in the art.

Lastly, although the ultraviolet light source is described in the above embodiment as being disposed in the upper side in the hood, it is also possible to dispose the lamp in the lower side or one of the lateral sides of the hood. In either of these cases, the areas of the indicia would be adjusted accordingly.

Finally, it must be understood that the invention is in no way limited to the above embodiments and that many changes may be brought about therein without departing from the scope of the invention as defined by the appended claims.

What is claimed is:

1. An indicator, comprising:
    a scale plate having a pointer rotatably mounted thereon;
    indicia provided on said scale plate and containing fluorescent brightener therein, said indicia indicating a specific value in cooperation with said pointer;
    a single ultraviolet light source for illuminating said indicia; and
    means for equalizing the brightness of said indicia when said indicia are illuminated by said single ultraviolet light source, the equalizing means comprising different quantities of the fluorescent brightener contained in the indicia, in which the indicia located on the scale plate far from the ultraviolet light source have a larger quantity of the fluorescent brightener than the indicia located near the ultraviolet source.

2. The indicator as claimed in claim 1, wherein said indicia are printed on the scale plate with ink containing the fluorescent brightener therein.

3. The indicator as claimed in claim 2, wherein said scale plate has an upper side thereof, and said ultraviolet light source is disposed on the upper side of the scale plate.

4. The indicator as claimed in claim 3, wherein said indicator further comprises a hood surrounding said scale plate, and said ultraviolet light source is disposed in said hood.

5. The indicator as claimed in claim 1, wherein said fluorescent brightener is selected from the group consisting of uranine, eosin, thioflavin T, and rhodamine B.

* * * * *